(12) United States Patent
Yu et al.

(10) Patent No.: US 10,509,959 B2
(45) Date of Patent: Dec. 17, 2019

(54) METHOD AND DEVICE FOR SEGMENTING LINES IN LINE CHART

(71) Applicant: ABC FINTECH CO., LTD., Beijing (CN)

(72) Inventors: Zhou Yu, Beijing (CN); Yongzhi Yang, Beijing (CN); Chen Chen, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 134 days.

(21) Appl. No.: 15/955,630

(22) Filed: Apr. 17, 2018

(65) Prior Publication Data
US 2019/0266395 A1    Aug. 29, 2019

(30) Foreign Application Priority Data
Feb. 26, 2018    (CN) .......................... 2018 1 0159638

(51) Int. Cl.
*G06K 9/00*    (2006.01)
*G06K 9/46*    (2006.01)

(52) U.S. Cl.
CPC ..... *G06K 9/00476* (2013.01); *G06K 9/00463* (2013.01); *G06K 9/4652* (2013.01); *G06K 2209/01* (2013.01)

(58) Field of Classification Search
CPC ........... G06K 9/00463; G06K 9/00476; G06K 9/4652; G06K 2209/01
See application file for complete search history.

(56) References Cited

U.S. PATENT DOCUMENTS

| 7,394,936 B2 * | 7/2008 | Li ........................... G06K 9/222 382/186 |
| 7,400,771 B2 * | 7/2008 | Li ........................... G06K 9/222 382/181 |
| 8,483,482 B2 * | 7/2013 | Fukunaga .......... G06K 9/00449 382/176 |
| 2016/0104305 A1 * | 4/2016 | Kim ..................... G06T 11/206 345/440 |

* cited by examiner

*Primary Examiner* — Brenda C Bernardi
(74) *Attorney, Agent, or Firm* — Morgan, Lewis & Bockius LLP

(57) ABSTRACT

The present application relates to a method and device for segmenting lines in a line chart. The device converts a line chart in which N legends are detected from an RGB color model to an LAB space model to obtain an LAB value of each legend in the line chart and an LAB value of each pixel in the line chart respectively; performs Euclidean distance calculation on the LAB value of each legend and the LAB value of each pixel in the line chart to generate N color difference distribution maps, one legend corresponding to one color difference distribution map; and finds out the minimum in each color difference distribution map, setting a segmentation threshold with reference to the minimum, and segmenting a rough line corresponding to the color difference distribution map in the color difference distribution map according to the segmentation threshold.

18 Claims, 11 Drawing Sheets

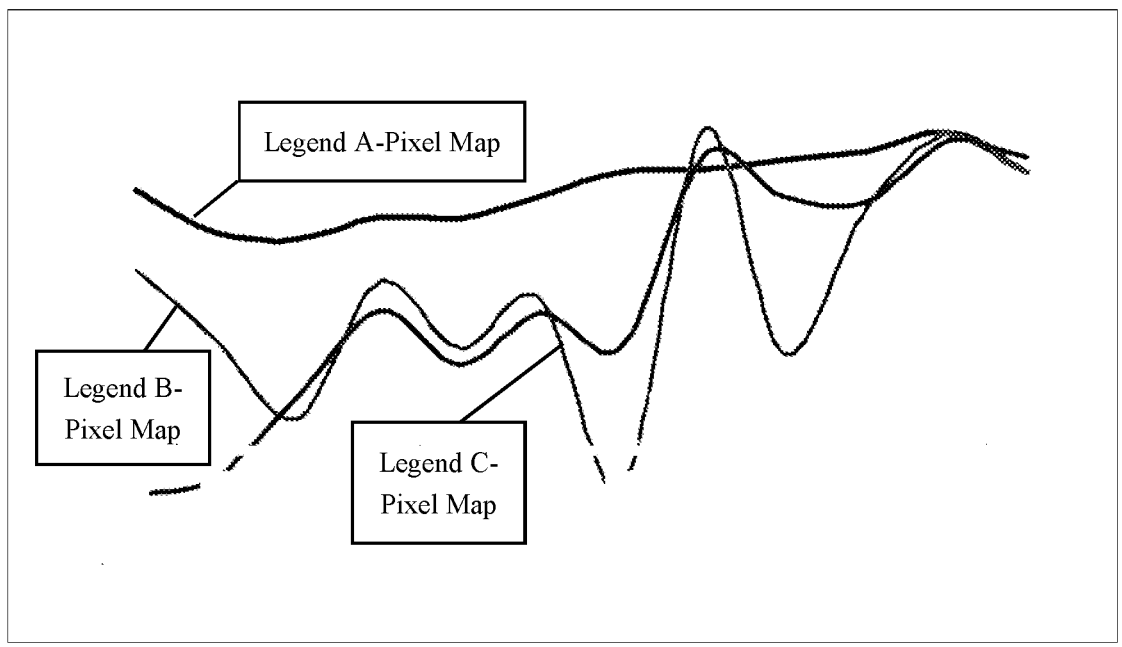
Fig. 6b
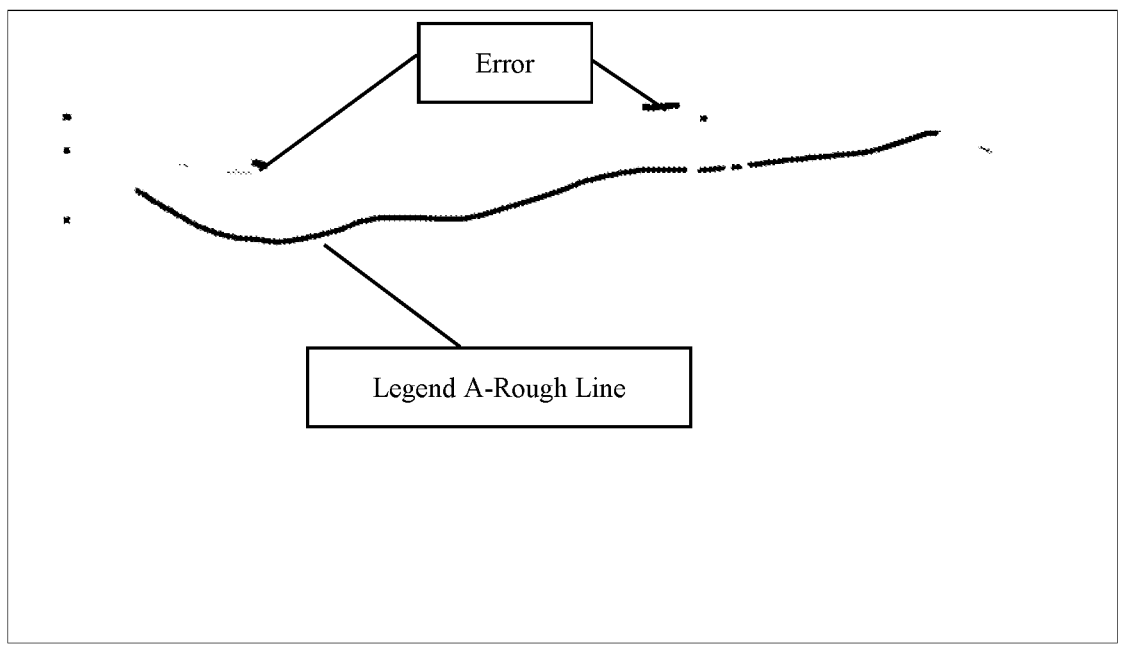
Fig. 6c1

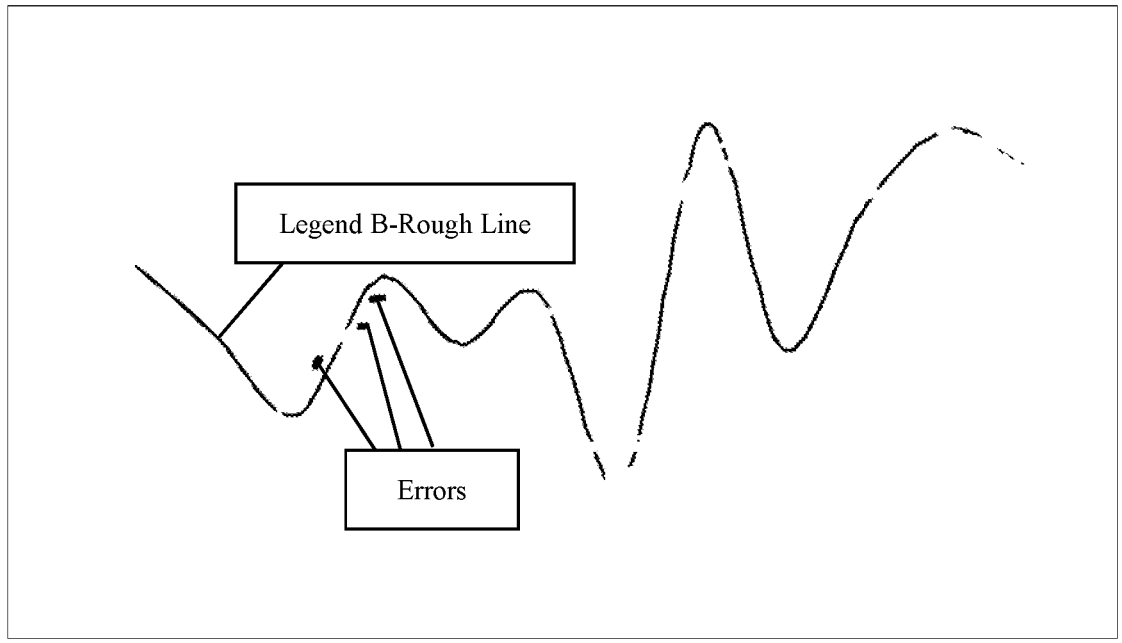
Fig. 6c2
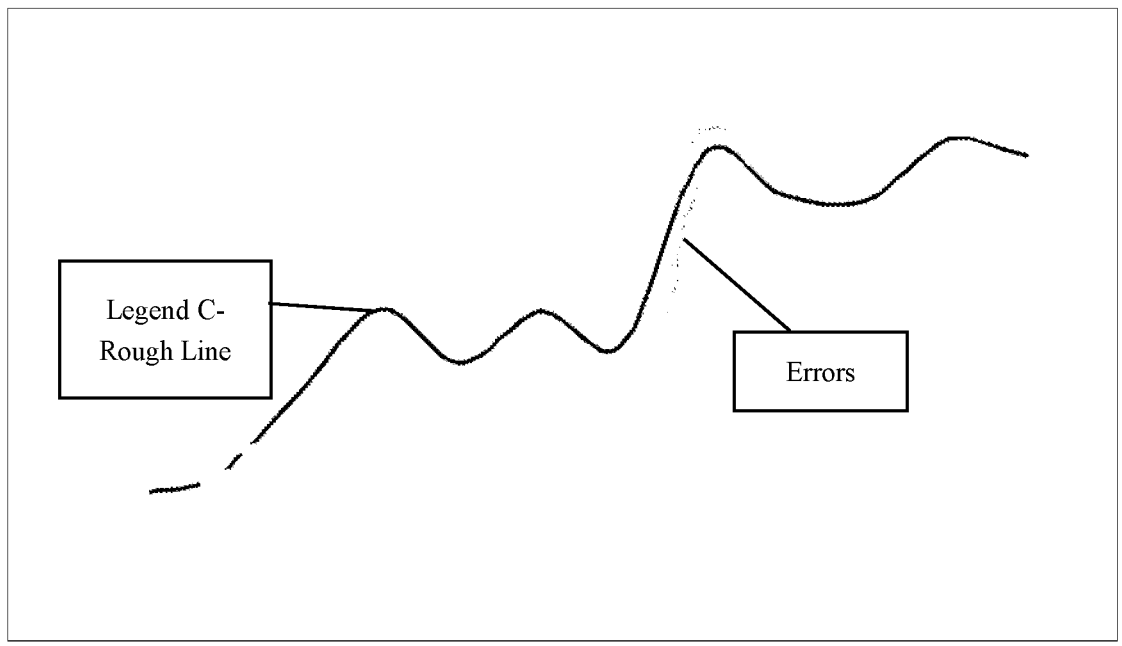
Fig. 6c3

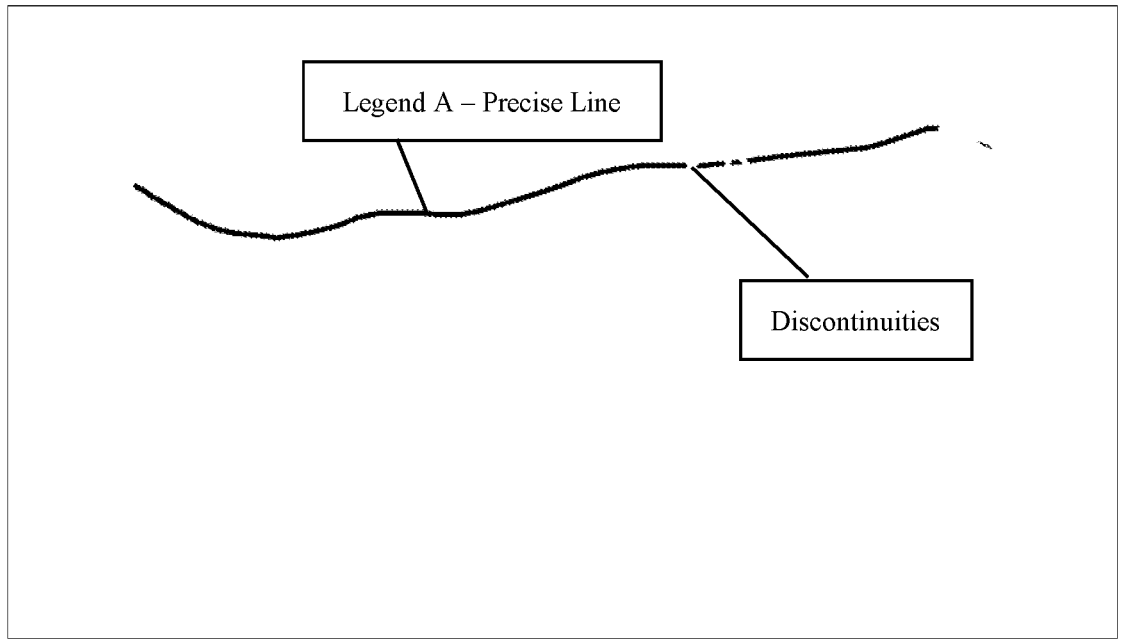
Fig. 6d1
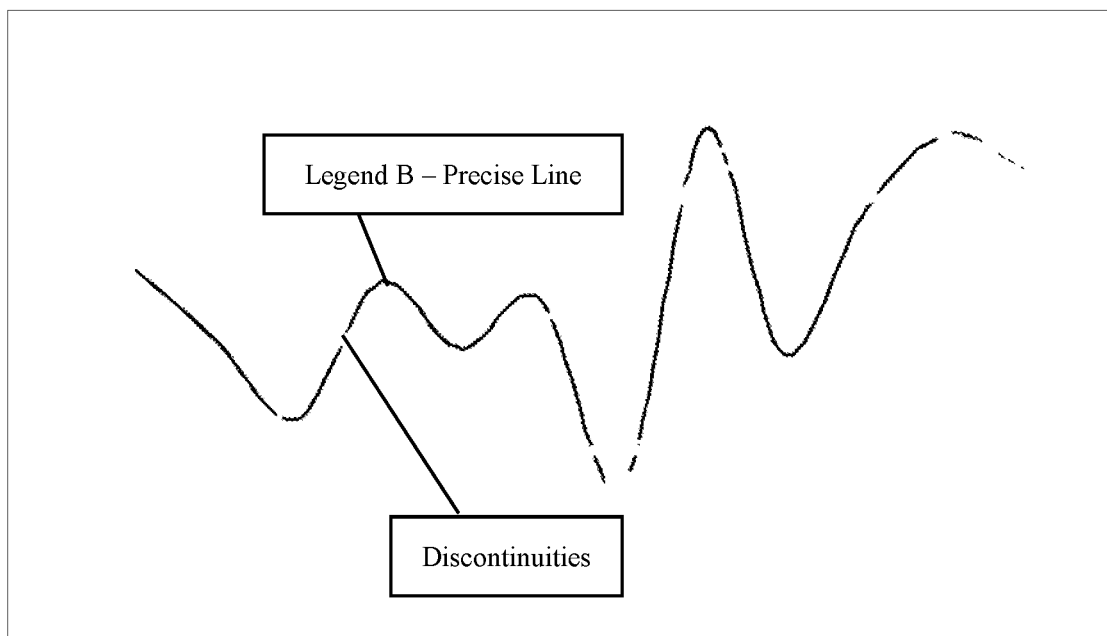
Fig. 6d2

Fig. 6d3

METHOD AND DEVICE FOR SEGMENTING LINES IN LINE CHART

CROSS-REFERENCE TO RELATED APPLICATION

This application claims the benefit of Chinese Patent Application No. 201810159638.8, filed Feb. 26, 2018 with State Intellectual Property Office, the People's Republic of China, the entire content of which is incorporated by reference herein.

TECHNICAL FIELD

The present application relates to the technical field of data processing, and particularly, relates to a method and device for segmenting lines in a line chart.

BACKGROUND

The line chart is one type of chart images, and is mainly composed of horizontal and vertical coordinate axes (including scale values), titles, legends, legend annotations, line data and the like together. The main purpose of analysis on the line chart is to effectively recover all data information in the original image, quantify each data point of the line and correspond to the scales of the analyzed horizontal and vertical coordinate axes at the same time. A viewer finally can view and review relevant data embodied by the line more clearly and accurately through the data recovered and quantified from the line chart.

Generally, the methods for line segment detection are mainly detection based on edge gradients, such as Laplace, Sobel, Canny and the like, or detect the start points, end points and inflection points of line segments by using Huff transform. According to these edges or line segments, approximate directions of the line segments are finally estimated by using complex image processing methods. The traditional edge detection or line segment detection methods are often constrained by many factors such as image noise, definition, etc. In the case of very complicated and mutually staggered lines, it is difficult to segment ideal results using the above methods. Therefore, in prior arts, it usually takes a long time and requires to occupy huge storage space of an electronic device for calculation to segment the lines in the line chart.

SUMMARY

The present application provides a solution to overcome the above shortcomings in the prior art and to provide a method and device for segmenting lines in a line chart to meet the requirements of complex line chart analysis and enhance the effect of line segmentation.

In order to fulfill the above objective, the embodiments of the present application provide the following technical solutions:

In one aspect, an embodiment of the present application provides a method for segmenting lines in a line chart by using an electronic device, including the following steps:
inputting a document including one or more line charts into the electronic device;
converting, by the electronic device, a line chart in which N legends are detected from an RGB color model to an LAB space model to obtain an LAB value of each legend in the line chart and an LAB value of each pixel in the line chart respectively;

performing, by the electronic device, Euclidean distance calculation on the LAB value of each legend and the LAB value of each pixel in the line chart to generate N color difference distribution maps, one legend corresponding to one color difference distribution map; and for each color difference distribution map, retaining, in the electronic device, only the pixels having the Euclidean distance values smaller than a set segmentation threshold to constitute a rough line.

In another aspect, an embodiment of the present application provides a device for segmenting lines in a line chart, including:

a conversion module, configured to convert a line chart in which N legends are detected from an RGB color model to an LAB space model to obtain respectively an LAB value of each legend in the line chart and an LAB value of each pixel in the line chart;

an Euclidean distance calculation module, configured to perform Euclidean distance calculation on the LAB value of each legend and the LAB value of each pixel in the line chart to generate N color difference distribution maps, one legend corresponding to one color difference distribution map; and a line segmentation module, configured to, for each color difference distribution map, only retain the pixels having the Euclidean distance values smaller than a set segmentation threshold to constitute a rough line.

In another aspect, an embodiment of the present application simultaneously provides a computer readable storage medium including computer readable instructions, wherein a processor executes the operations in the method of the embodiment of the present application when the computer readable instructions are executed.

In another aspect, an embodiment of the present application simultaneously provides an electronic equipment, including: a memory, configured to store program instructions; and a processor, connected with the memory, and configured to execute the program instructions in the memory to implement the steps of the method in the embodiment of the present application.

Compared with the prior art, the present application has the advantages: the color space of the lines is matched with the color space of the legends to segment and extract each line, so that a simple and effective solution is provided for the line segmentation problem, and the segmentation result of the best effect is realized by using the shortest program running time. Therefore, compared with the prior art, the method for segmenting the lines in a line chart according to the present application uses shorter time to complete the complicated calculation for lines segmentation, thereby saving storage space occupying in the electronic device.

BRIEF DESCRIPTION OF THE DRAWINGS

In order to illustrate the technical solutions in the embodiments of the present application more clearly, a brief introduction will be made below to the drawings required in the embodiments. It should be understood that the drawings below only show some embodiments of the present application and should not be regarded as limit to the scope, and other relevant drawings could be obtained based on these drawings by those of ordinary skill in the art without any creative efforts.

FIGS. 6a, 6b, 6c-1, 6c-2, 6c-3, 6d-1, 6d-2, 6d-3 and 6e are respectively an original line chart, an effect chart of line positions calculated in an LAB color space and similar to those of the legends, an effect chart of a segmented rough line, an effect chart of a segmented precise line, and a reconstructed line chart according to some embodiments of the present application.

DETAILED DESCRIPTION OF THE EMBODIMENTS

Figure 1A:
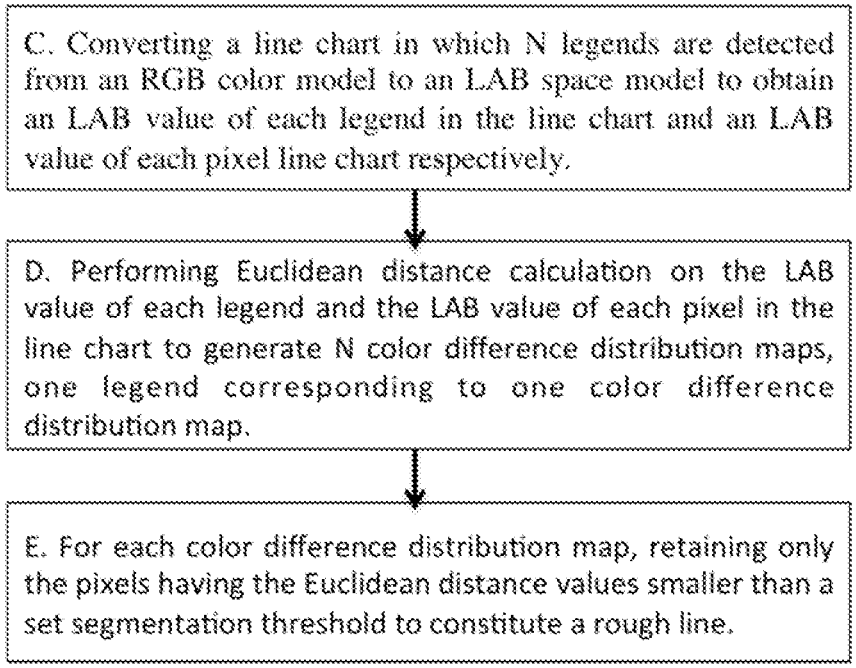
FIG. 1a and FIG. 1b are flow diagrams of a method for segmenting lines in a line chart according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Referring to FIG. 1a, a method for segmenting lines in a line chart, provided by this embodiment, includes the following steps:

C. convert a line chart in which N legends are detected from an RGB color model to an LAB space model to obtain an LAB value of each legend in the line chart and an LAB value of each pixel in the line chart respectively.

Figure 2:
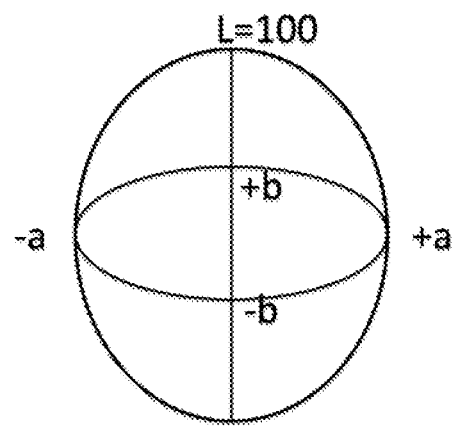
FIG. 2 is an LAB color difference space model diagram according to some embodiments of the present application.

The LAB color space is a CIE-specified international standard for determining colors. This color model differs from other color models in that it is independent from a display device itself and is based on human eye sense (that is, the color difference calculated from LABs of two colors is the same as that of subjective human eye sense). In the LAB space, L represents the brightness, a represents the range from red to green, and B is the range from yellow to blue, as shown in FIG. 2.

The RGB color space cannot be directly converted into the LAB color space, but depends on an XYZ color space. The RGB color space is converted into the XYZ color space, and then the XYZ color space is converted into the LAB color space. The relations between the RGB color space and the XYZ color space, and between the XYZ color space and the LAB color space, are respectively as follows, and the line chart can be converted from the RGB color space to the LAB color space according to these relations.

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix}$$

$$L^* = 116 f(Y/Y_n) - 16, A^* = 500[f(X/X_n) - f(Y/Y_n)],$$

$$B^* = 200[f(Y/Y_n) - f(Z/Z_n)], f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases}.$$

It should be noted that, in the method of this embodiment, each line is segmented by matching the color space of the line with the color space of the legends. Therefore, in this step, the input line chart is a line chart in which the positions of the legends have been detected. After conversion, taking the color space of the legends as a reference, the line corresponding to each legend is segmented. The detection of the legend positions can be performed by adopting a target detection method. The basic principle of the target detection algorithm is to learn a classifier through a training set, and then scan the entire image in a sliding manner at different scale windows of a test image. Classification is performed in each scan to judge whether the current window is a target to be detected. For example, a Faster R-CNN algorithm may be adopted, and if the input is a large image (bitmap), the output is a bounding rectangle of a region of interest in the large image. For example, 10,000 samples are marked in advance, each sample is accurately marked with the position and size of the data in the image, and the samples are used to train the Faster R-CNN. The target detection algorithm can not only detect the legends, but also can detect a horizontal coordinate axis, a vertical coordinate axis, titles, legend annotations and other information in the line chart. After the bounding rectangular regions are detected, the region of interest of the text part is input to an OCR model for text recognition, and a corresponding text recognition result can be obtained, that is, after Faster R-CNN detection and OCR recognition, the positions and specific information of the horizontal coordinate axis, the vertical coordinate axis, the titles and the legend annotations, wherein the specific information refers to specific data or text content, e.g., horizontal coordinate axis (scale) data and vertical coordinate axis (scale) data, as well as legend annotations, e.g., "Yangquan washed small-sized coal" and "Yangquan washed medium-sized coal". The detected data can be provided for reconstruction of the line chart. Both the Faster R-CNN detection and the OCR recognition are mature existing technologies, and are not further described herein.

D. perform Euclidean distance calculation on the LAB value of each legend and the LAB value of each pixel in the line chart to generate N color difference distribution maps, wherein N is a natural number and one legend corresponds to one color difference distribution map. The Euclidean distance value also becomes delta E (a numerical unit for measuring color difference) that can measure the difference between two colors. Each pixel in the color difference map is expressed in Euclidean distance (the Euclidean distance in two color LAB spaces is equivalent to the color difference in the two color LAB spaces). The Euclidean distance for calculating color difference here is equal to the color difference value.

Figure 3A:
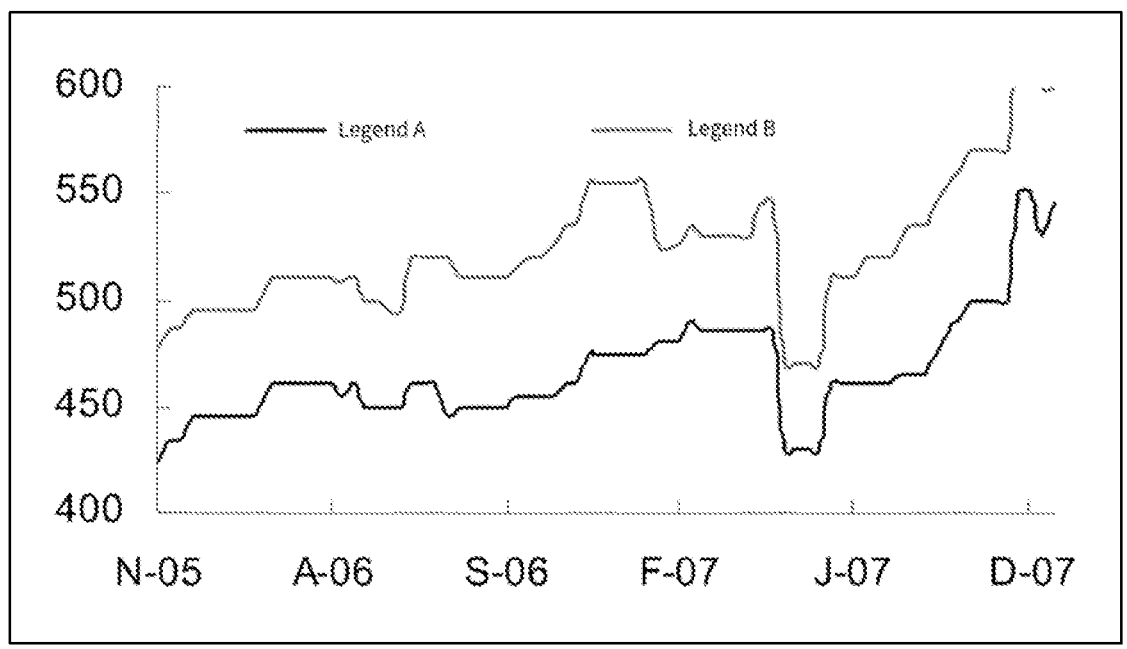
FIGS. 3a-e are respectively an original line chart, an effect chart of target detection, an effect chart of a segmented rough line, a schematic diagram of seed points in the rough line, and an effect chart of a segmented precise line according to some embodiments of the present application.
Figure 3B:
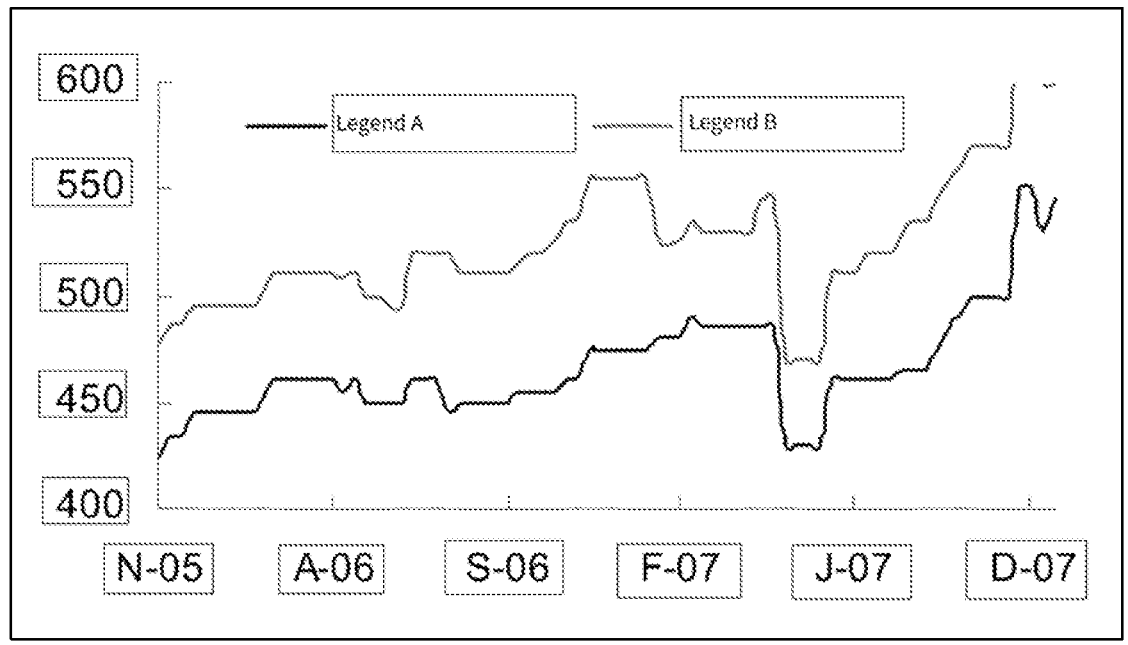
Figure 3C:
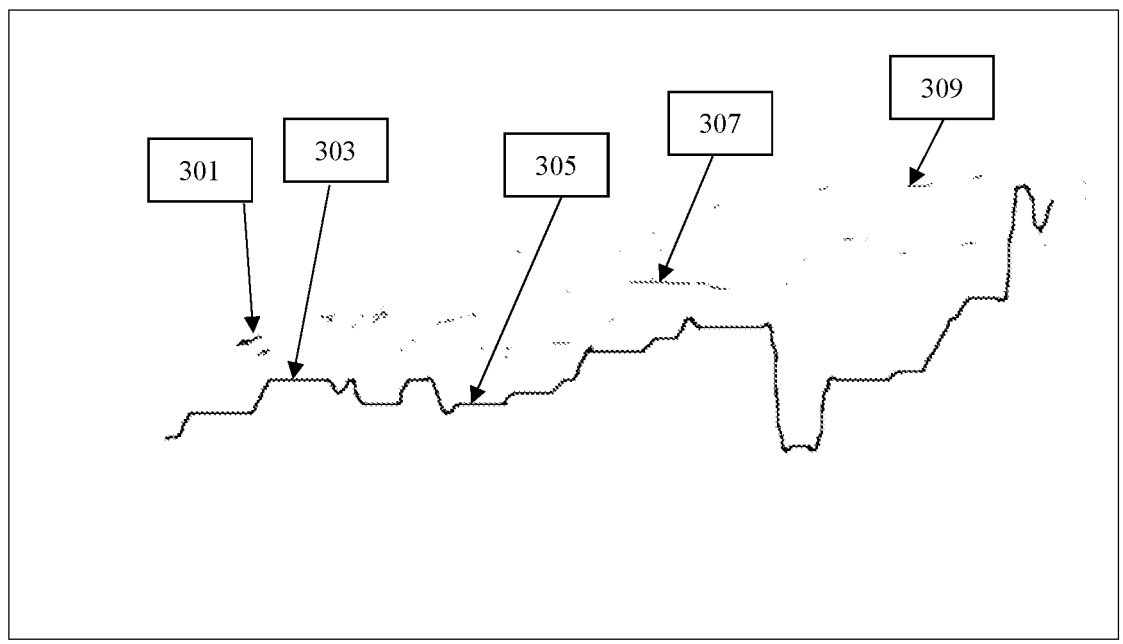

E. for each color difference distribution map, retain only the pixels having the Euclidean distance values smaller than a set segmentation threshold to constitute a rough line, as shown in FIG. 3c. It should be noted that, the rough line here refers to a line that is segmented initially and not processed in later step F relative to a precise line below. Note that in this example, most of the pixels having the Euclidean distance values smaller than the set segmentation threshold corresponds to the line of Legend A depicted in FIG. 3b (e.g., 303 and 305). But because of errors in the color difference distribution map, certain portions of the line of Legend B depicted in FIG. 3b (e.g., 301, 307 and 309) are also present in FIG. 3c, which will be removed in the later step F as depicted in FIG. 3e.

When the N color difference distribution maps are obtained, a segmentation threshold is set according to prior experience. The segmentation threshold can be used in each color difference distribution map, and thus color difference pixels smaller than the segmentation threshold in each color difference distribution map can be segmented. These color difference pixels constitute a line desired to be segmented.

The threshold is given through the prior experience based on the fact that when the color difference in the LAB color space is calculated, if delta E (color difference) is less than 3, it proves that such color difference is hard to discover by the human visual system, whereas if delta E is more than 3, human eyes can clearly distinguish the same color. The segmentation threshold can be set at about 5, thus, only the pixels having the color differences less than 5 are retained in each color difference distribution map, which indicates the line is constituted by the pixels closest to those in the legend in color, and the remaining pixels having the color differences more than 5 can be judged as the pixels having great color difference from those of the legend.

In the above method, the RGB color of each legend is converted to the LAB space, the pixels of the image of the line chart are gradually converted from the RGB space to the LAB space, then Euclidean distance calculation is performed on the LAB value of each legend and the LAB value of each pixel of the line chart to generate color difference distribution maps of delta E, the minimum value in each color difference distribution map is the line corresponding to the current legend, the principle is that, when the Euclidean distance calculation is performed on the LAB of each legend and the entire image, if the color of the line is more similar to that of the legend, the value of the Euclidean distance is smaller, i.e., the delta E is smaller. A segmentation threshold is given through the priori experience, and then the specific position of the line can be roughly segmented. Thus, a simple and effective solution is provided for the line segmentation problem, the running time is short, the segmentation effect is good, and the problem that the existing line segment detection method cannot adapt to the segmentation of complex lines is also solved.

When the color difference distribution map of delta E is obtained, the rough line segmented by using the segmentation threshold is often mixed with some noise points, the noise points are always very small in area, but the real connection area of the line is very large.

In order to remove these noise points, the noise points can be ranked and judged according to the obtained Euclidean distance values. If the distance is shorter, the possibility that the noise points are line data is higher. Although the data points having relatively large Euclidean distance values are within the segmentation threshold range, the confidence is relatively low, then the data points can be ranked according to all the Euclidean distance values to select first M data points from all data points as seed points having relatively high confidence, and the first M data points having the smallest Euclidean distances (i.e., delta E) are filled with seeds to completely segment a line of interest and remove the interference noise at the same time.

Figure 1B:
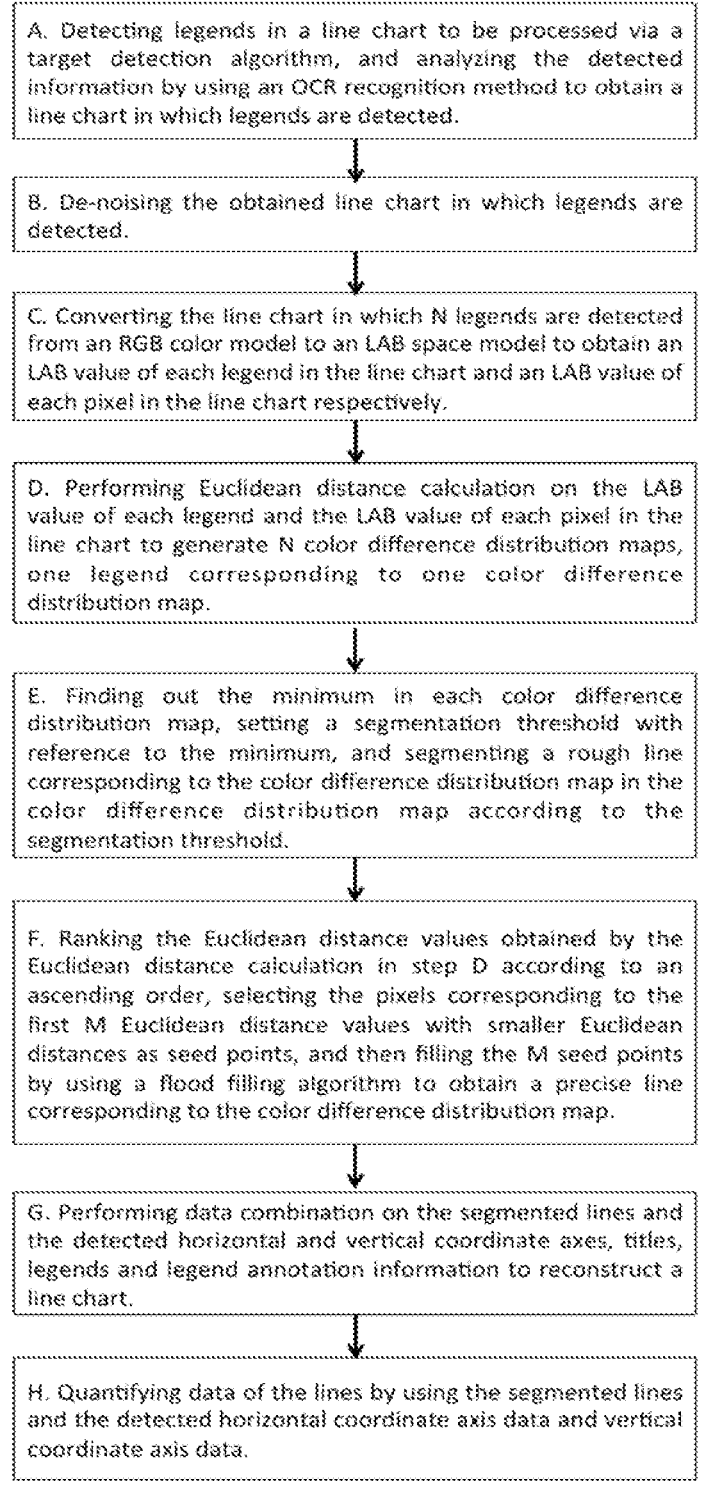
Figure 3D:
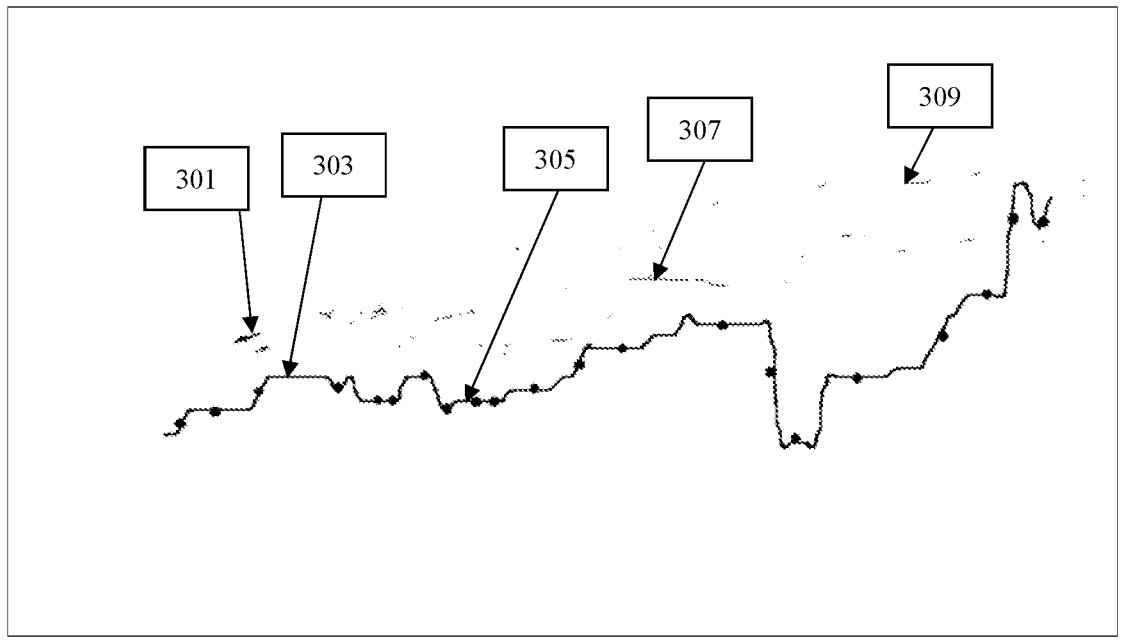
Figure 3E:
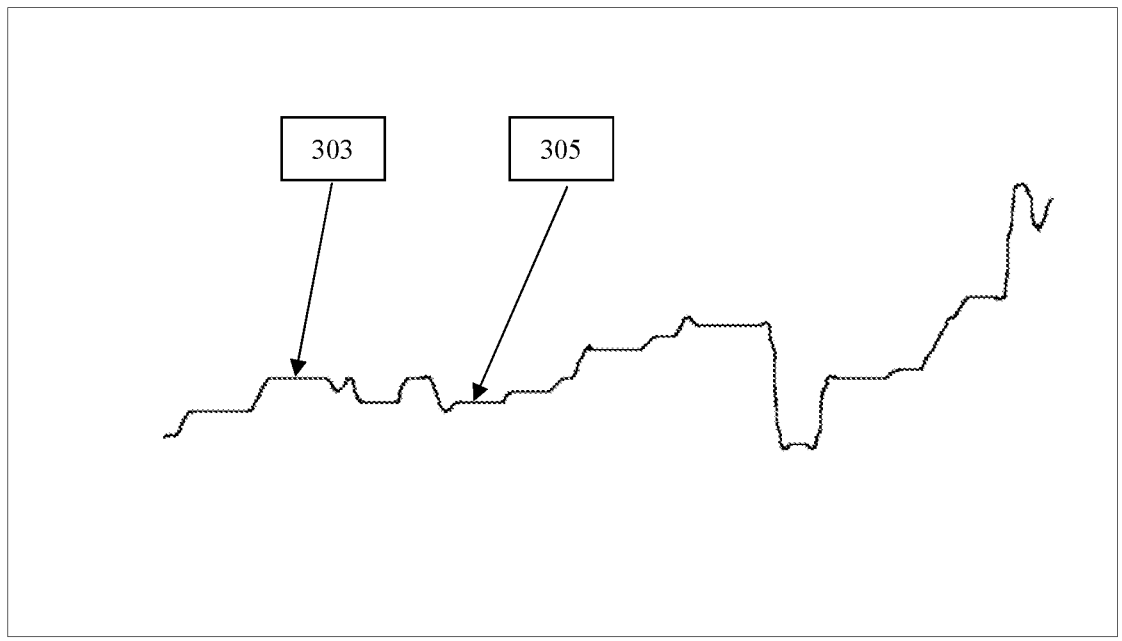

That is to say, as a more preferred embodiment, referring to FIG. 1b, the above method further includes step F after step E: ranking the Euclidean distance values obtained by the Euclidean distance calculation in step D according to an ascending order, and selecting the pixels corresponding to the first M smaller Euclidean distance values as seed points, as shown in FIG. 3d, in which the 11 gray dots in FIG. 3d represent the seed points (note that, according to step E, all the 11 gray dots are found in the pixel map corresponding to the line of Legend A such as 303 and 305 and none of them is on the pixel map corresponding to the line of Legend B such as 301, 307 and 309); and then filling the M seed points by using a flood filling algorithm to obtain a precise line corresponding to the color difference distribution map, as shown in FIG. 3e (note that the errors in the pixel map corresponding to the line of Legend B such as 301, 307 and 309 are removed from the figure with only the precise line corresponding to the line of Legend A such as 303 and 305 being kept). In the process of filling, for example, these seed points can be used for calculating the Euclidean distances in 8 directions around. As long as the distances are very small (for example, smaller than the set threshold), these seed points are considered to form connected regions. Finally, all regions can be connected and aggregated to obtain a precise line.

In another embodiment, in order to further enhance the segmentation effect of the line, after the legend is detected by the target detection algorithm, the method further includes step B of de-noising the obtained line chart of the detected legends to obtain a line chart with higher image quality of the detected legends. In step C, the color space conversion is performed on the de-noised line chart.

The de-noising process of step B may be: inputting the line chart in which the legends are detected to a pre-trained full convolutional network model to output a de-noised and resolution-improved image.

The full convolutional network model includes an input layer, convolutional layers, an activation layer, residual modules, a batch norm (BN) layer and a sub-pixel layer. The full convolutional network model may be trained via the following steps:

a. randomly initialize parameters of the full convolutional network model;

b. randomly select Batchsize sample pictures, and randomly cut a W*H image on each sample picture as a target image sample for the current iteration;

c. normalize each pixel in the target image samples to −1 to 1;

d. perform 2-fold resolution reduction of bilinear interpolation on the target image samples, and perform JPEG compression according to a random compression ratio to obtain simulated JPEG compression images having the size of $$\frac{W}{2} * \frac{H}{2}.$$

This step is to obtain a pattern of noise images in the actual file by furthest simulation. Images of various JPEG image qualities can be obtained via the random compression ratio, so that the adaptability of the model is stronger.

e. input a batch of JPEG images obtained in step d to the full convolutional network model in step a to obtain output images having the size of W*H; and f. calculate a current mean square error loss for the current iteration:

$$loss = \frac{1}{Batchsize * W * H} \sum_{x=1}^{W} \sum_{y=1}^{H} (\text{target} - \text{output})^2,$$

wherein target is a target value of a high-definition PNG image of a sample picture, and output is an output value obtained by inputting the corresponding low-resolution JPEG image to the network model.

The required sample is trained and output in the form of a PNG high-definition image, and the low-resolution JPEG image is randomly generated in model training. The target PNG image may be drawn via a vector PDF according to an assigned high resolution (e.g., a resolution of 1600*1200), and 100,000 images are randomly selected for training the model and stored in a disk as sample pictures.

g. update the parameters of the current full convolutional network model by using a BP algorithm. The BP algorithm is a standard method for parameter updating in a neural network. When the parameters are updated, a gradient descent method, i.e., a method of finding a weight parameter W corresponding to the optimal solution loss, is adopted. The specific step is as follows: solving a derivative for each parameter W in a loss function, finding out a negative gradient direction dW of each parameter, and then performing a small step update, i.e., updating the weight W=W+ learning_rate*dW, wherein learning_rate is a learning rate or is understood as an update step length, for example, is set to 0.001. This step is iterated. Because the derivative is solved from a composite function (multilayer neural network), the chain rule in calculus is adopted. The chain rule is embodied as back propagation (BP) in the neural network, and BP is a dedicated term in the neural network. dW is calculated forward in sequence from the last layer.

Steps b to g are repeatedly executed until reaching a preset number of iterations. The number of iterations is set according to empirical values, e.g., the number of iterations may be set to 100,000 herein. When the number of iterations is set, its minimum at least should guarantee that the minimum mean loss no longer declines.

After the JPEG image to be processed is processed with the full convolutional network model trained by the above process, JPEG noise can be removed, the resolution of the image is improved and a high-quality image is obtained.

In another embodiment, the above method may further include step G of performing data combination on the segmented lines and the detected horizontal and vertical coordinate axes, titles, legends and legend annotation information, to reconstruct a line chart using a free data visualization interface provided by HIGHCHARTS.

In another embodiment, after step A, the method may further include step H of quantifying data of the lines by using the segmented lines and the detected horizontal coordinate axis data and vertical coordinate axis data. Quantifying data of the lines refers to calculating specific data represented by each point in the lines. Since the line is continuous, more data is calculated. A simple implementation may be adopted for interval quantification, i.e., the entire line is divided into a plurality of small segments, one small segment corresponds to an interval in the x axis, and only one data of each small segment, e.g., the maximum of the small segment, is quantified. The process of quantification is a process of solving a linear function of one variable according to the data of two known points, which is the prior art and will not be elaborated herein.

After the line data is quantified, the quantified data can be displayed separately, or displayed in the reconstructed line chart at the same time.

It should be noted that each step in the above method has no sequence of execution unless otherwise explicitly or indirectly stated that there is an execution sequence among the steps. For example, step H, besides following steps A-C, may precede or follow any other steps.

Figure 6A:
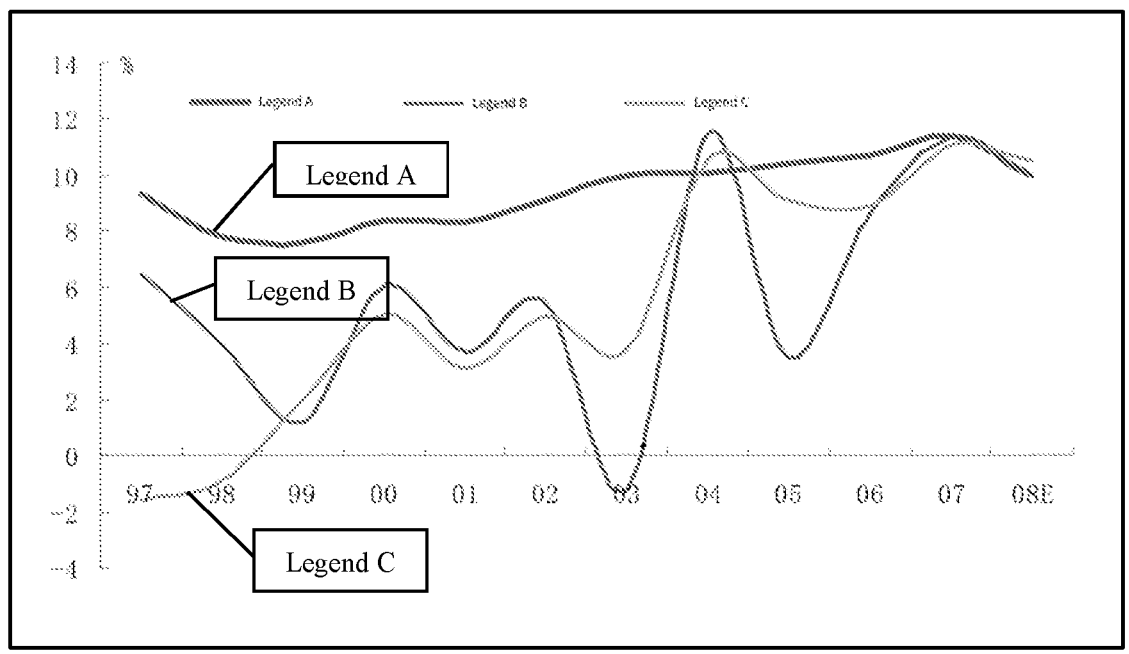
Figure 6E:
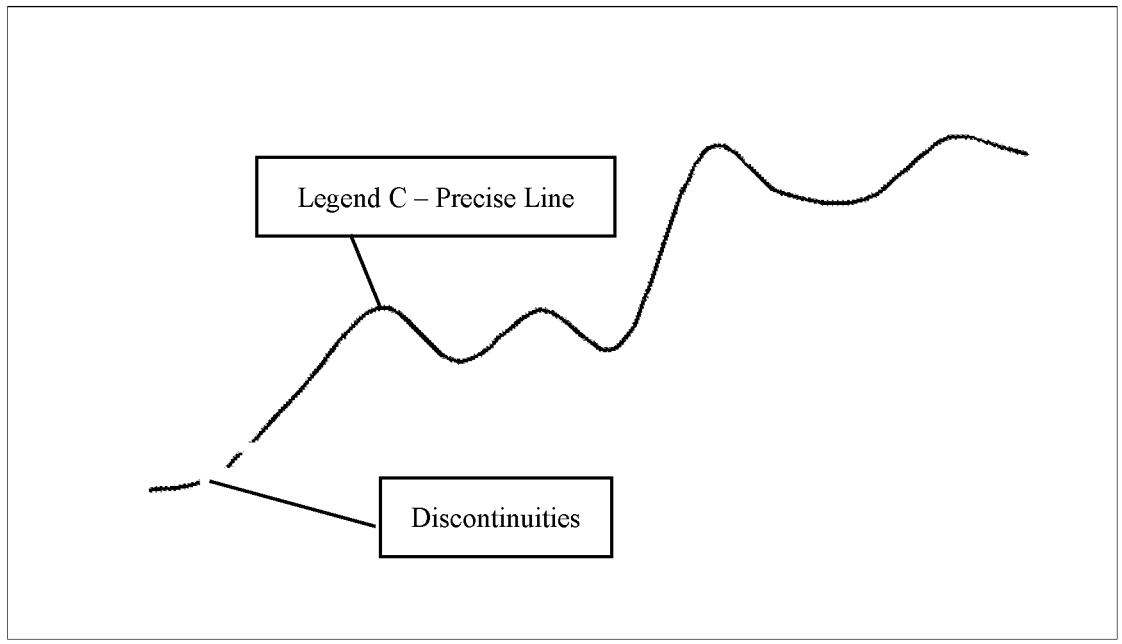
Figure 6E:
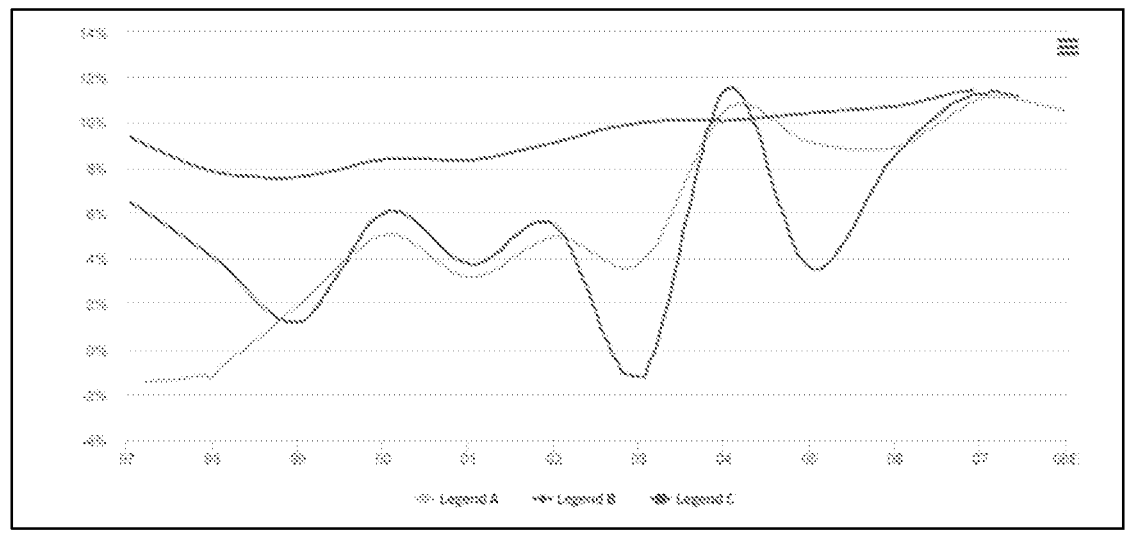

As shown in FIGS. 6a-e, FIG. 6a is an original line chart, FIG. 6b is an effect chart of line positions calculated in an LAB color space and similar to those of the legends, FIGS. 6c-1 to 6c-3 are respectively charts of three extracted rough lines, FIGS. 6d-1 to 6d-3 are respectively charts of three extracted precise lines, and FIG. 6e is a reconstructed line chart. FIG. 6a depicts three lines corresponding to Legend A, Legend B, and Legend C, each having a unique line width and gray scale. FIG. 6b depicts the three lines in the form of pixel map in the LAB color space. Note that due to the errors in the color difference distribution map, some of the line (especially the portions of the lines corresponding to the Legend B and the Legend C that are overlapping with the horizontal axis and the numeric labels along the horizontal axis depicted in FIG. 6a) are no longer contiguous. This is inevitable because there is always error in the calculation of the color difference distribution map of any figure. FIG. 6c-1 depicts the pixels extracted from FIG. 6b whose Euclidean distance values are smaller than a set segmentation threshold. Similar to FIG. 3c, other than the rough line corresponding to Legend A, there are some errors introduced into this pixel map as depicted in FIG. 6c-1. Similarly, FIG. 6c-2 depicts the rough line corresponding to Legend B as well as some errors introduced to the pixel map and FIG. 6c-3 depicts the rough line corresponding to Legend C as well as some errors introduced to the pixel map. But as depicted in FIGS. 6d-1, 6d-2 and 6d-3, the errors are removed from the drawings according to step E described above. Note that the three precise lines still have some discontinuities, especially at those locations where two or more lines cross each other. But as explained above, this is normal in most of the processes of extracting information from a pixel map.

Figure 4:
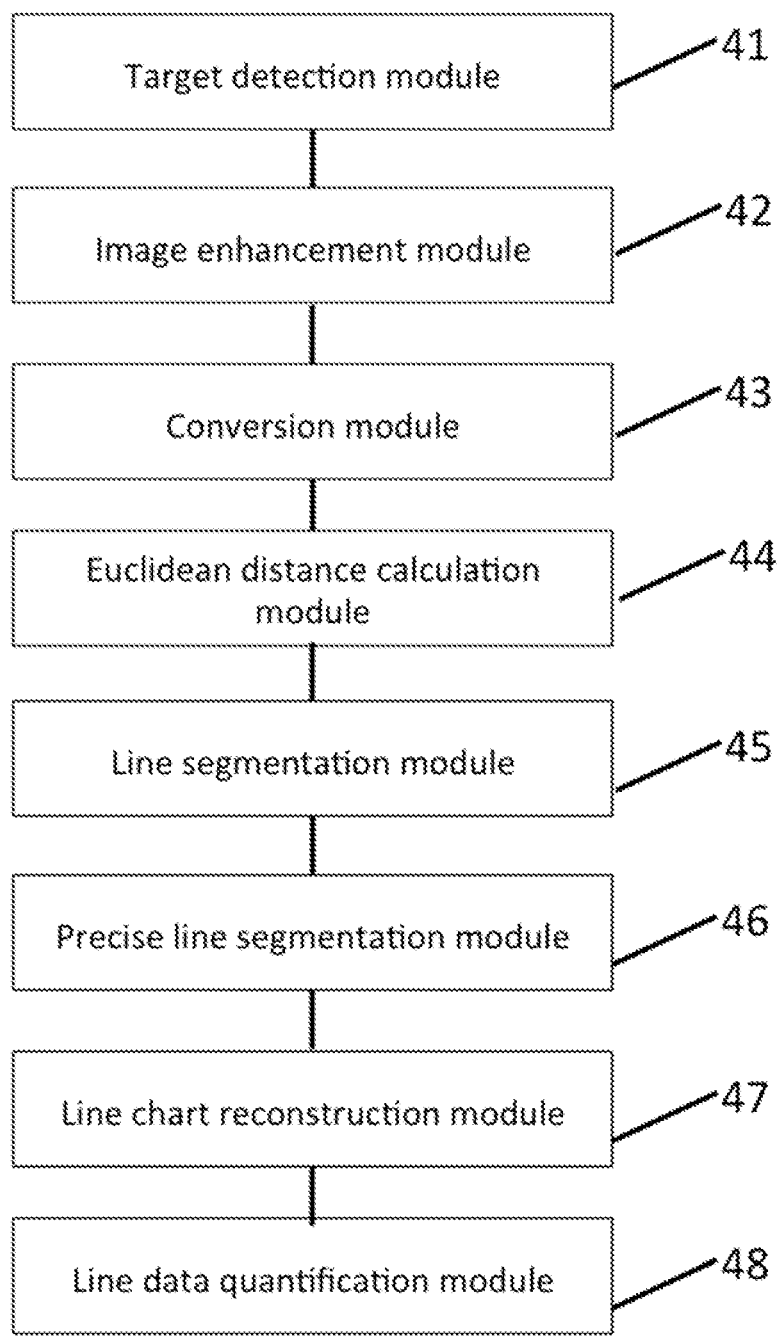
FIG. 4 is a functional module diagram of a device for segmenting lines in a line chart according to some embodiments of the present application.

Based on the same inventive idea as the above method, an embodiment of the present application further provides a line segmentation device for a line chart. As shown in FIG. 4, the device mainly includes a target detection module 41, an image enhancement module 42, a conversion module 43, a Euclidean distance calculation module 44, a line segmentation module 45, a precise line segmentation module 46, a line chart reconstruction module 47 and a line data quantification module 48.

The target detection module 41 is configured to detect horizontal and vertical coordinate axes, titles, legends, and legend annotation information in a line chart to be processed via a target detection algorithm, and analyze the detected information by using an OCR recognition method to obtain a line chart of the detected legends.

The image enhancement module 42 is configured to de-noise the obtained line chart of the detected legends to obtain a line chart with higher image quality of the detected legends.

The conversion module 43 is configured to convert the line chart in which N legends are detected from an RGB color model to an LAB space model to obtain an LAB value of each legend in the line chart and an LAB value of each pixel in the line chart respectively.

The Euclidean distance calculation module 44 is configured to perform Euclidean distance calculation on the LAB value of each legend and the LAB value of each pixel in the line chart to generate N color difference distribution maps, wherein one legend corresponds to one color difference distribution map.

The line segmentation module 45 is configured to find out the minimum in each color difference distribution map, set a segmentation threshold with reference to the minimum, and segment a rough line corresponding to the color difference distribution map in the color difference distribution map according to the segmentation threshold.

The precise line segmentation module 46 is configured to rank the Euclidean distance values calculated by the Euclidean distance calculation module according to an ascending order, select the pixels corresponding to the first M Euclidean distance values as seed points, and then fill the M seed points by using a flood filling algorithm to obtain a precise line corresponding to the color difference distribution map.

The line chart reconstruction module 47 is configured to perform data combination on the segmented lines and the detected horizontal and vertical coordinate axes, titles, legends and legend annotation information, to reconstruct the line chart.

The line data quantification module 48 is configured to quantize data of the lines by using the segmented lines and the detected horizontal coordinate axis data and vertical coordinate axis data.

For the uninvolved part in the embodiment of the line segmentation device for a line chart, reference may be made to the corresponding description in the foregoing embodiment of the line segmentation method for a line chart.

Figure 5:
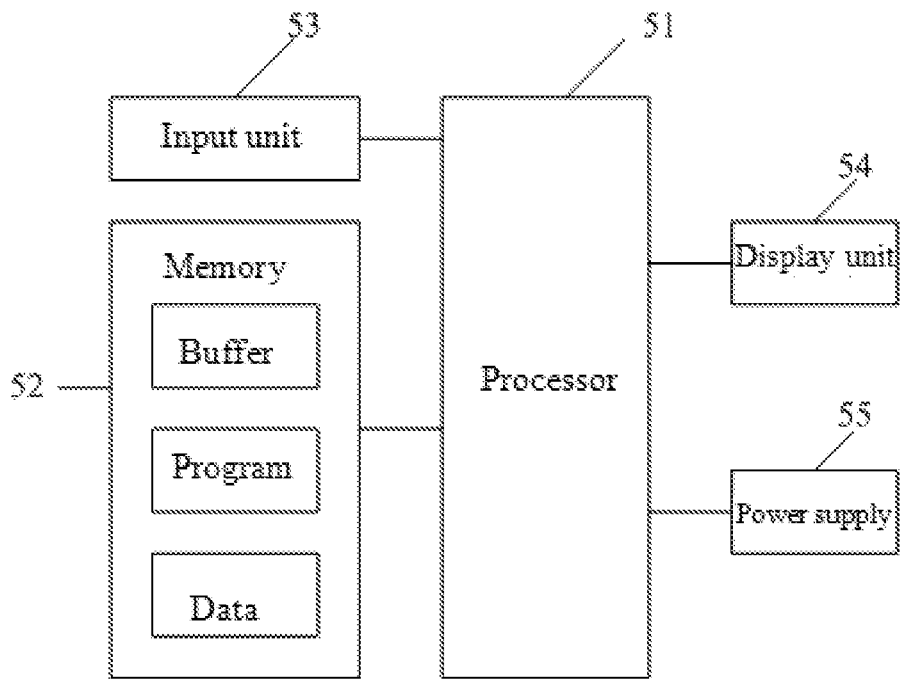
FIG. 5 is a structure block diagram of the electronic equipment according to some embodiments of the present application.

As shown in FIG. 5, this embodiment simultaneously provides electronic equipment. The electronic equipment may include a processor 51 and a memory 52, wherein the memory 52 is coupled to the processor 51. It is worth noting that the figure is exemplary, and the structure may also be supplemented or replaced by using other structure to realize data extraction, graph redrawing, communication or other functions.

As shown in FIG. 5, the electronic equipment may further include an input unit 53, a display unit 54 and a power supply 55. It should be noted that the electronic equipment does not necessarily include all components shown in FIG. 5. Moreover, the electronic equipment may further include components not shown in FIG. 5, referring to the prior art.

The processor 51 is also referred to as a controller or an operation control sometimes, and may include a microprocessor or other processor device and/or logic device. The processor 51 receives an input and controls the operation of each component of the electronic equipment.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded graph data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a sample image or a line image to be processed for the processor 51. The display unit 54 is configured to display an effect chart of each segmented line or a reconstructed line chart. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and method steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a computer readable storage medium. Based on such an understanding, the technical solution of the present application substantially, or all or part of the present application making contribution to the prior art, or a part of the technical solution may be embodied in the form of a software product, and the computer software product is stored in a storage medium, which includes a plurality of instructions enabling computer equipment (which may be a personal computer, a server, or network equipment or the like) to execute all or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or an optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

What is claimed is:

1. A method for segmenting lines in a line chart performed by an electronic device having a processor and memory for storing computer instructions to be executed by the processor, the method comprising:
    inputting, by the electronic device, a document including one or more line charts into the electronic device;
    converting, by the electronic device, a line chart in which N legends are detected from an RGB color model to an LAB space model, to obtain respectively an LAB value of each legend in the line chart and an LAB value of each pixel in the line chart;
    performing, by the electronic device, Euclidean distance calculation on the LAB value of each legend and the LAB value of each pixel in the line chart to generate N color difference distribution maps, one legend corresponding to one color difference distribution map; and
    for each color difference distribution map, retaining, by the electronic device, only the pixels having the Euclidean distance value smaller than a set segmentation threshold to constitute a rough line.

2. The method according to claim 1, further comprising:
    ranking, by the electronic device, the Euclidean distance values obtained by the Euclidean distance calculation according to an ascending order;
    selecting, by the electronic device, the pixels corresponding to the first M Euclidean distance values having smaller Euclidean distances as seed points; and
    filling, by the electronic device, the M seed points by using a flood filling algorithm to obtain a precise line corresponding to the color difference distribution map.

3. The method according to claim 1, further comprising:
    detecting, by the electronic device, a horizontal coordinate axis, a vertical coordinate axis, titles, legends and legend annotation information in the line chart to be processed via a target detection algorithm; and
    analyzing, by the electronic device, the detected information by using an OCR recognition method to obtain the line chart in which the legends are detected.

4. The method according to claim 3, further comprising:
    de-noising, by the electronic device, the obtained line chart in which the legends are detected, wherein the color space conversion is performed on the de-noised line chart.

5. The method according to claim 3, further comprising:
    performing, by the electronic device, data combination on the segmented lines and the detected horizontal and vertical coordinate axes, titles, legends and legend annotation information to reconstruct the line chart.

6. The method according to claim 3, further comprising:
    quantifying, by the electronic device, data of the lines by using the segmented lines and the detected horizontal coordinate axis data and vertical coordinate axis data.

7. An electronic device for segmenting lines in a line chart, comprising:
    a processor;
    memory; and
    a plurality of computer instructions stored in the memory, wherein the computer instructions, when executed by the processor, cause the electronic device to perform operations including:
        inputting, by the electronic device, a document including one or more line charts into the electronic device;
        converting, by the electronic device, a line chart in which N legends are detected from an RGB color model to an LAB space model, to obtain respectively an LAB value of each legend in the line chart and an LAB value of each pixel in the line chart;
        performing, by the electronic device, Euclidean distance calculation on the LAB value of each legend and the LAB value of each pixel in the line chart to generate N color difference distribution maps, one legend corresponding to one color difference distribution map; and
        for each color difference distribution map, retaining, by the electronic device, only the pixels having the Euclidean distance value smaller than a set segmentation threshold to constitute a rough line.

8. The electronic device according to claim 7, wherein the plurality of computer instructions further comprise instructions for:
    ranking, by the electronic device, the Euclidean distance values obtained by the Euclidean distance calculation according to an ascending order;
    selecting, by the electronic device, the pixels corresponding to the first M Euclidean distance values having smaller Euclidean distances as seed points; and
    filling, by the electronic device, the M seed points by using a flood filling algorithm to obtain a precise line corresponding to the color difference distribution map.

9. The electronic device according to claim 7, wherein the plurality of computer instructions further comprise instructions for:
    detecting, by the electronic device, a horizontal coordinate axis, a vertical coordinate axis, titles, legends and legend annotation information in the line chart to be processed via a target detection algorithm; and
    analyzing, by the electronic device, the detected information by using an OCR recognition method to obtain the line chart in which the legends are detected.

10. The electronic device according to claim 9, wherein the plurality of computer instructions further comprise instructions for:

de-noising, by the electronic device, the obtained line chart in which the legends are detected, wherein the color space conversion is performed on the de-noised line chart.

11. The electronic device according to claim 9, wherein the plurality of computer instructions further comprise instructions for:

performing, by the electronic device, data combination on the segmented lines and the detected horizontal and vertical coordinate axes, titles, legends and legend annotation information to reconstruct the line chart.

12. The electronic device according to claim 9, wherein the plurality of computer instructions further comprise instructions for:

quantifying, by the electronic device, data of the lines by using the segmented lines and the detected horizontal coordinate axis data and vertical coordinate axis data.

13. A non-transitory computer readable storage medium comprising a plurality of computer readable instructions that, when executed by a processor of an electronic device, cause the electronic device to perform operations including:

inputting, by the electronic device, a document including one or more line charts into the electronic device;

converting, by the electronic device, a line chart in which N legends are detected from an RGB color model to an LAB space model, to obtain respectively an LAB value of each legend in the line chart and an LAB value of each pixel in the line chart;

performing, by the electronic device, Euclidean distance calculation on the LAB value of each legend and the LAB value of each pixel in the line chart to generate N color difference distribution maps, one legend corresponding to one color difference distribution map; and for each color difference distribution map, retaining, by the electronic device, only the pixels having the Euclidean distance value smaller than a set segmentation threshold to constitute a rough line.

14. The non-transitory computer readable storage medium according to claim 13, wherein the plurality of computer instructions further comprise instructions for:

ranking, by the electronic device, the Euclidean distance values obtained by the Euclidean distance calculation according to an ascending order;

selecting, by the electronic device, the pixels corresponding to the first M Euclidean distance values having smaller Euclidean distances as seed points; and filling, by the electronic device, the M seed points by using a flood filling algorithm to obtain a precise line corresponding to the color difference distribution map.

15. The non-transitory computer readable storage medium according to claim 13, wherein the plurality of computer instructions further comprise instructions for:

detecting, by the electronic device, a horizontal coordinate axis, a vertical coordinate axis, titles, legends and legend annotation information in the line chart to be processed via a target detection algorithm; and analyzing, by the electronic device, the detected information by using an OCR recognition method to obtain the line chart in which the legends are detected.

16. The non-transitory computer readable storage medium according to claim 15, wherein the plurality of computer instructions further comprise instructions for:

de-noising, by the electronic device, the obtained line chart in which the legends are detected, wherein the color space conversion is performed on the de-noised line chart.

17. The non-transitory computer readable storage medium according to claim 15, wherein the plurality of computer instructions further comprise instructions for:

performing, by the electronic device, data combination on the segmented lines and the detected horizontal and vertical coordinate axes, titles, legends and legend annotation information to reconstruct the line chart.

18. The non-transitory computer readable storage medium according to claim 15, wherein the plurality of computer instructions further comprise instructions for:

quantifying, by the electronic device, data of the lines by using the segmented lines and the detected horizontal coordinate axis data and vertical coordinate axis data.

\* \* \* \* \*